United States Patent
Tokunaga et al.

(10) Patent No.: US 9,772,524 B2
(45) Date of Patent: Sep. 26, 2017

(54) LIQUID CRYSTAL DROPPING DEVICE AND METHOD OF MANUFACTURING LIQUID CRYSTAL DISPLAY APPARATUS

(71) Applicant: Sakai Display Products Corporation, Sakai-shi, Osaka (JP)

(72) Inventors: Hiroaki Tokunaga, Sakai (JP); Shinya Kasahara, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/110,083

(22) PCT Filed: Jan. 23, 2014

(86) PCT No.: PCT/JP2014/051318
§ 371 (c)(1),
(2) Date: Jul. 6, 2016

(87) PCT Pub. No.: WO2015/111162
PCT Pub. Date: Jul. 30, 2015

(65) Prior Publication Data
US 2016/0334655 A1 Nov. 17, 2016

(51) Int. Cl.
*G02F 1/1341* (2006.01)
*G02F 1/1339* (2006.01)
(Continued)

(52) U.S. Cl.
CPC .......... *G02F 1/1339* (2013.01); *G02F 1/1303* (2013.01); *G02F 1/1341* (2013.01);
(Continued)

(58) Field of Classification Search
CPC ................. G02F 2001/13415; G02F 1/1341
See application file for complete search history.

(56) References Cited

U.S. PATENT DOCUMENTS 2,607,342 A * 8/1952 Abel ................. A61M 5/31513
128/DIG. 14
3,150,801 A * 9/1964 Hamilton .......... A61M 5/31513
222/158
(Continued)

FOREIGN PATENT DOCUMENTS

CN 1769969 A 5/2006
CN 1946487 A 4/2007
(Continued)

*Primary Examiner* — Jeff Aftergut
(74) *Attorney, Agent, or Firm* — Rudy J. Ng; Bret E. Field; Bozicevic, Field & Francis LLP

(57) ABSTRACT

Provided are: a liquid crystal dropping device capable of accurately dropping liquid crystal material while generation of foreign substances is suppressed; and a method of manufacturing a liquid crystal display apparatus capable of manufacturing a liquid crystal display apparatus with preferable display quality and high yield in which the occurrence of a display failure such as a luminous-dot failure is suppressed. The liquid crystal dropping device 1 includes a liquid crystal bottle 2 which stores liquid crystal material 61, a three-way valve 3, a liquid crystal ejecting part 4, a nozzle 5 and a driving unit 7. The liquid crystal ejecting part 4 includes a syringe 41 with a bottomed cylindrical shape as well as a plunger 44 constituted by a slide part 42 which slides in the syringe 41 and a support 43 which has a bar-like shape and supports the slide part 42. The operation control part 8 reciprocates the plunger 44 before the liquid crystal material 61 is dropped from the nozzle 5, with a reciprocating distance shorter than a stroke for dropping the liquid crystal material.

3 Claims, 7 Drawing Sheets

(51) Int. Cl.
*G02F 1/13* (2006.01)
*G02F 1/1335* (2006.01)
*G02F 1/1343* (2006.01)
*G02F 1/1362* (2006.01)
*G02F 1/1368* (2006.01)

(52) U.S. Cl.
CPC ........ *G02F 1/1368* (2013.01); *G02F 1/13439* (2013.01); *G02F 1/133514* (2013.01); *G02F 1/136286* (2013.01); *G02F 2001/13415* (2013.01); *G02F 2001/136295* (2013.01); *G02F 2201/121* (2013.01); *G02F 2201/123* (2013.01)

(56) References Cited

U.S. PATENT DOCUMENTS

| | | | |
|---|---|---|---|
| 4,046,287 A * | 9/1977 | Hoekstra | B01F 13/1055 141/329 |
| 2005/0126475 A1 | 6/2005 | Jeong et al. | |
| 2006/0092371 A1 | 5/2006 | Motomatsu | |
| 2006/0102877 A1 | 5/2006 | Kim et al. | |
| 2008/0248193 A1 | 10/2008 | Nakatsuji et al. | |

FOREIGN PATENT DOCUMENTS

| | | |
|---|---|---|
| JP | 2005-148754 A | 6/2005 |
| JP | 2006-133251 A | 5/2006 |
| JP | 2008-284441 A | 11/2008 |

\* cited by examiner

LIQUID CRYSTAL DROPPING DEVICE AND METHOD OF MANUFACTURING LIQUID CRYSTAL DISPLAY APPARATUS

CROSS-REFERENCE TO RELATED APPLICATIONS

This application is the national phase under 35 U.S.C. §371 of PCT International Application No. PCT/JP2014/051318 which has an International filing date of Jan. 23, 2014 and designated the United States of America.

BACKGROUND

1. Technical Field

The present invention relates to a liquid crystal dropping device which comprises a syringe for storing liquid crystal material, a plunger which is reciprocated in the syringe and a driving unit for driving the plunger, to drop liquid crystal material onto a substrate included in a liquid crystal display apparatus, and to a method of manufacturing a liquid crystal display apparatus.

2. Description of Related art

Among display apparatuses, a liquid crystal display apparatus has characteristics of being thin and consuming a small amount of electricity. Specifically, a liquid crystal display apparatus comprising a TFT substrate having a switching element such as a thin film transistor (TFT) or the like for each pixel presents high performance including high contrast ratio and good response characteristics, and is thus preferably used for a television receiver, a personal computer and so forth.

The display panel of a liquid crystal display apparatus has a pair of substrates (TFT substrate and color filter substrate) constituted by transparent glasses facing each other with a predetermined distance in between and a liquid crystal layer interposed between these substrates. The pair of substrates are bonded to each other with a seal material interposed in between, including a liquid crystal layer between the substrates.

Examples of the method of filling a space between the substrates of the display panel with liquid crystal material include dipping, dispensing and so forth. Such a method includes bonding a mother glass substrate of the TFT substrate to a mother glass substrate of the color filter substrate through a seal material, filling, for each divided panel, liquid crystal material through an opening of a seal pattern, and thereafter sealing the opening, to obtain a display panel.

In recent years, One Drop Filling (ODF) is often employed as a method of filling the inside of the display panel with a liquid crystal material.

The ODF is a method of dropping liquid crystal material into a frame of a seal pattern of the mother glass substrate of one of the substrates (TFT substrate or color filter substrate) before being aligned with the other substrate, without an opening in the seal pattern, and thereafter aligning and bonding the substrate with the other one of the substrates under reduced pressure. The ODF has an advantage of tremendously reducing the cycle time for liquid crystal material.

The liquid crystal dropping device used in the ODF method includes a syringe for injecting liquid crystal material, a plunger which is reciprocated in the syringe and a driving unit for driving the plunger, and is configured to switch the syringe and the plunger in accordance with a substrate and to drop liquid crystal material onto the one of the substrates.

In the ODF method, a syringe is filled with liquid crystal material which is then dropped onto the substrate, possibly causing the liquid crystal material to have foreign substances mixed therein compared to the dipping method.

As the plunger is stopped after switching the syringe and the plunger in accordance with the substrate until the liquid crystal material is started to be dropped onto the next substrate, the leading end of the plunger made of synthetic resin is in contact with the inner wall of the syringe and thus the leading end may be adhered to the inner wall. If the plunger is operated for dropping liquid crystal material in such a state, the adhered synthetic resin may be peeled because of the high resistance between the leading end and the inner wall of the syringe, so that dust generated by peeled resin may get mixed into the display panel as foreign substances.

When foreign substances get mixed into the display panel, problems arise in that, for example, a display failure such as a failure of visually recognizing bright dots (luminous-dot failure) is caused, thereby degrading the display quality and lowering the yield.

To address such problems, Japanese Patent Application Laid-Open Publication No. 2006-133251 discloses an invention of a liquid crystal dropping device comprising a filtering unit such as a filter in the transfer path of liquid crystal material between a container for storing liquid crystal material and a nozzle for dropping the liquid crystal material onto a substrate.

FIG. 7 is a schematic side view illustrating the structure of a liquid crystal dropping device 71.

The liquid crystal dropping device 71 includes a liquid crystal bottle 2, a three-way valve 3, a liquid crystal ejecting part 4, a nozzle 5 and a driving unit 7. Liquid crystal material 61 is stored in the liquid crystal bottle 2. The lower end of the liquid crystal bottle 2 is connected to one end of a flow pipe 24, while the other end of the flow pipe 24 is connected to the three-way valve 3. One end of the flow pipe 25 is connected to the three-way valve 3, while the other end of the flow pipe 25 is connected to the liquid crystal ejecting part 4.

The liquid crystal ejecting part 4 includes a syringe 41 and a plunger 44 located in the syringe 41. The plunger 44 includes a slide part 42 which has substantially the same diameter as the inner diameter of the syringe 41 and slides in the syringe 41, and a support 43 which has a rod-like shape and supports the slide part 42. The driving unit 7 is constituted by, for example, a stepping motor which controls the extruded amount of the slide part 42 by the amount of rotation. One end of the flow pipe 51 is connected to the three-way valve 3, while the other end thereof is connected to the nozzle 5. A filter 28 is provided at a midway part of the flow pipe 51.

In the case where the liquid crystal material 61 is dropped onto a substrate, the flow pipe 24 side and the flow pipe 25 side of the three-way valve 3 are opened, and the plunger 44 is lowered to feed a predetermined amount of liquid crystal material to the syringe 41. Next, the flow pipe 25 side and the flow pipe 51 side of the three-way valve 3 are opened, and the plunger 44 is raised by the driving unit 7 to feed liquid crystal material to the nozzle 5, from which the liquid crystal material is dropped onto the substrate.

As the liquid crystal dropping device 71 includes the filter 28, foreign substances which may be mixed into the liquid crystal material 61 are removed, thereby suppressing the occurrence of a display failure such as a luminous-dot failure and suppressing the degrading in the display quality and lowering in the yield.

SUMMARY

Since the liquid crystal dropping device 71 according to Japanese Patent Application Laid-Open Publication No. 2006-133251 described above includes the filter 28, such a problem arises that the accuracy of dropping is lowered due to a loss of pressure.

The present invention has been made in view of the circumstances described above, and aims to provide a liquid crystal dropping device which can precisely drop liquid crystal material while generation of foreign substances is suppressed, and a method of manufacturing a liquid crystal display apparatus capable of manufacturing a liquid crystal display apparatus which suppresses the occurrence of a display failure such as a luminous-dot failure and achieves preferable display quality and high yield.

A liquid crystal dropping device according to one embodiment of the present invention, configured to drop the liquid crystal material onto a substrate, comprising: a syringe which is used for storing the liquid crystal material; a plunger being reciprocated in the syringe; and a driving unit which drives the plunger, further comprises a unit which controls reciprocation of the plunger by the driving unit before the liquid crystal material is dropped onto the substrate, with a reciprocating distance shorter than a stroke required for dropping the liquid crystal material.

According to the embodiment, as the plunger is reciprocated before dropping the liquid crystal material, it is suppressed that the leading end of the plunger made of synthetic resin is adhered to the inner wall of the syringe. Accordingly, it is suppressed that the synthetic resin is peeled off when the process of dropping the liquid crystal material is performed so that it is suppressed that dust generated by peeled resin as foreign substances gets mixed into the liquid crystal material.

Unlike the liquid crystal dropping device 71 in Japanese Patent Application Laid-Open Publication No. 2006-133251 including the filter 28 for removing foreign substances, no additional component is required, causing no pressure loss due to the filter 28 and achieving high accuracy of dropping.

In the liquid crystal dropping device according to the embodiment of the present invention, it is preferred that the syringe is made of glass, and a leading end of the plunger is made of a fluorine-based resin.

According to the embodiment, the adherence of the leading end of the plunger to the inner wall of the syringe is more preferably suppressed.

A method of manufacturing a liquid crystal display device according to one embodiment of the present invention, comprising, with the use of a liquid crystal dropping device including a syringe which is used for storing the liquid crystal material, a plunger being reciprocated in the syringe and a driving unit which drives the plunger, the steps of dropping the liquid crystal material onto a surface of a first substrate; and bonding a second substrate to a part of the surface of the first substrate, further comprises the step of reciprocating the plunger by the driving unit in the case where the syringe and the plunger are switched in accordance with the one substrate, the step of reciprocating being performed after the switching and before the step of dropping.

According to the embodiment, when the syringe and the plunger are switched in accordance with the first substrate, as the step of reciprocating the plunger by the driving unit is performed before liquid crystal material is dropped onto the first substrate, it is suppressed that the leading end of the plunger is adhered to the inner wall of the syringe. Accordingly, it is suppressed that the synthetic resin is peeled off when the process of dropping liquid crystal material is performed so that it is suppressed that dust generated by peeled resin as foreign substances gets mixed into the liquid crystal material.

Hence, no pressure loss is caused unlike the case including a filter, thereby achieving high accuracy of dropping while suppressing the occurrence of a display failure such as a luminous-dot failure in the liquid crystal display apparatus, thereby achieving preferable display quality and high yield.

As the liquid crystal dropping device of the embodiment of the present invention includes a unit for reciprocating the plunger by the driving unit before liquid crystal material is dropped onto a substrate, it is suppressed that the synthetic resin used for the leading end of the plunger is adhered to the inner wall of the syringe. Accordingly, it is suppressed that the synthetic resin is peeled off when the process of dropping liquid crystal material is performed so that it is suppressed that dust generated by peeled resin as foreign substances gets mixed into the liquid crystal material. Also, since no filter is included, no pressure loss is caused, achieving high accuracy in dropping.

The method of manufacturing a liquid crystal display apparatus according to the present invention comprises the step of reciprocating the plunger by the driving unit after the syringe and the plunger are switched and before liquid crystal material is dropped onto the first substrate, which suppresses the generation of foreign substances and the occurrence of a display failure such as a luminous-dot failure in the liquid crystal display apparatus, and achieves preferable display quality and yield.

The above and further objects and features will more fully be apparent from the following detailed description with accompanying drawings.

DETAILED DESCRIPTION

The present invention will be described below in detail with reference to the drawings illustrating the embodiments thereof.

Figure 1:
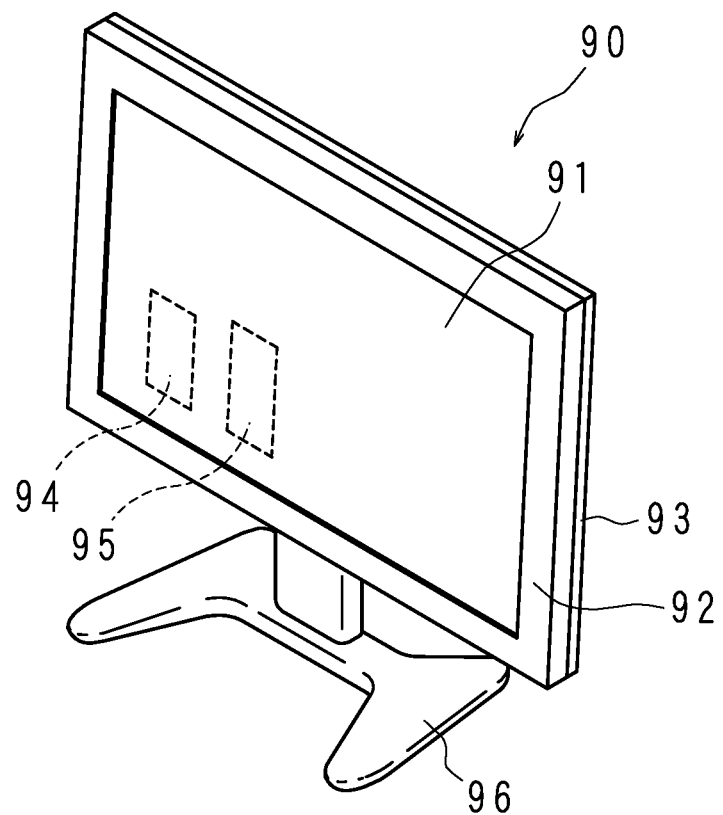
FIG. 1 is a schematic perspective view illustrating a television receiver (hereinafter referred to as a TV receiver) comprising a liquid crystal display apparatus (display module) according to the present invention.
Figure 2:
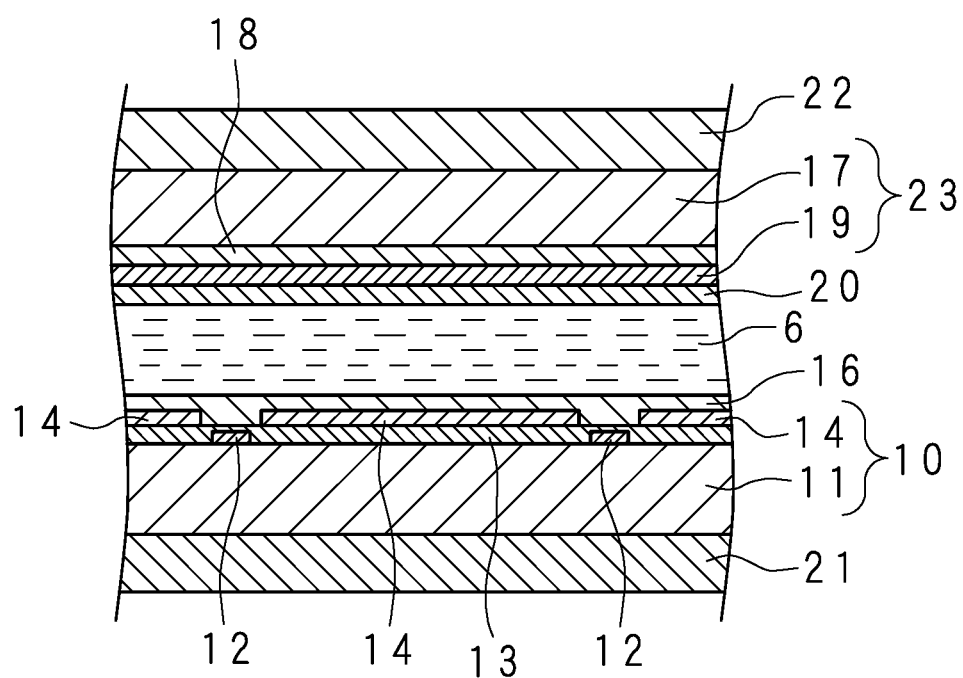
FIG. 2 is a schematic cross-sectional view illustrating a display panel included in the display module.

FIG. 1 is a schematic perspective view illustrating a TV receiver 90 comprising a liquid crystal display apparatus (display module 91) according to the present invention, and FIG. 2 is a schematic cross-sectional view illustrating a display panel 3 included in the display module 91.

The TV receiver 90 comprises a horizontally-long display module 91 on which an image is displayed, a tuner 94 which receives broadcast waves from an antenna (not illustrated) and a decoder 95 which decodes coded broadcast waves. The TV receiver 90 decodes at the decoder 95 the broadcast waves received by the tuner 94, and displays an image on the display module 91 based on the decoded information. At the lower part of the TV receiver 90, a stand 96 is provided for supporting the TV receiver 90.

The display module 91 is accommodated with a vertical attitude inside a front cabinet 92 and a rear cabinet 93 that are vertically arranged at the front and rear respectively. The front cabinet 92 is a rectangular frame body which covers the circumferential part of the display module 91, while the rear cabinet 93 has the shape of a rectangular tray with its front side open.

The display module 91 comprises a display panel 30 and, though not depicted, a chassis with a substantial box shape, a light guide plate accommodated at the bottom surface of the chassis through a reflection sheet, a light emitting diode (LED) substrate provided at a side surface of the chassis to face a side surface of the light guide plate, and an optical sheet, for example three optical sheets, located on the front surface of the light guide plate. While the display module 91 according to the present embodiment is an edge light type, the display module 91 may be a direct type, which includes a diffusion plate instead of the light guide plate. In addition, the light source is not limited to the LED.

As illustrated in FIG. 2, the display panel 30 has substrates 11, 17 constituted by a pair of transparent glasses facing each other with a predetermined distance in between and a liquid crystal layer 6 interposed between these substrates 11, 17.

Gate wirings 12 are formed on the substrate 11 and an is formed to cover the substrate 11 and the gate wirings 12. Multiple pixel electrodes 14 are formed on the interlayer film 13 and a transparent alignment film 16 is formed to cover the pixel electrodes 14. The pixel electrodes 14 are formed together with an active matrix. FIG. 2 illustrates the gate wirings 12 of the active matrix. The TFT substrate 10 is configured by the substrate 11, the gate wirings 12, the interlayer film 13 and the pixel electrodes 14.

On the substrate 17, a color filter 18, a common electrode 19 and an alignment film 20 are laminated in this order. A color filter substrate 23 is configured by the substrate 17, the color filter 18 and the common electrode 19.

The alignment films 16, 20 are bonded together with the liquid crystal layer 6 interposed in between to fix the substrates 11, 17, and polarization plates 21, 22 are provided at the outer sides of the substrates 11, 17.

Figure 3:
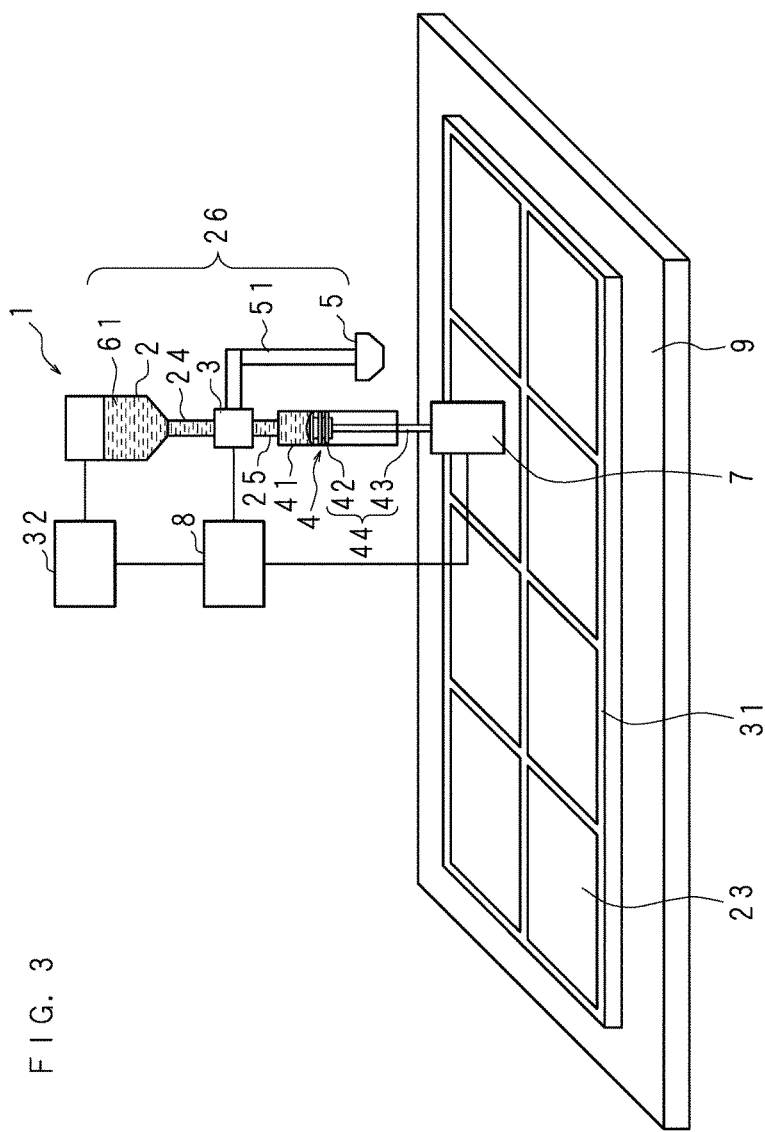
FIG. 3 is a schematic view of a liquid crystal dropping device and a mother glass substrate according to an embodiment of the present invention.
Figure 4:
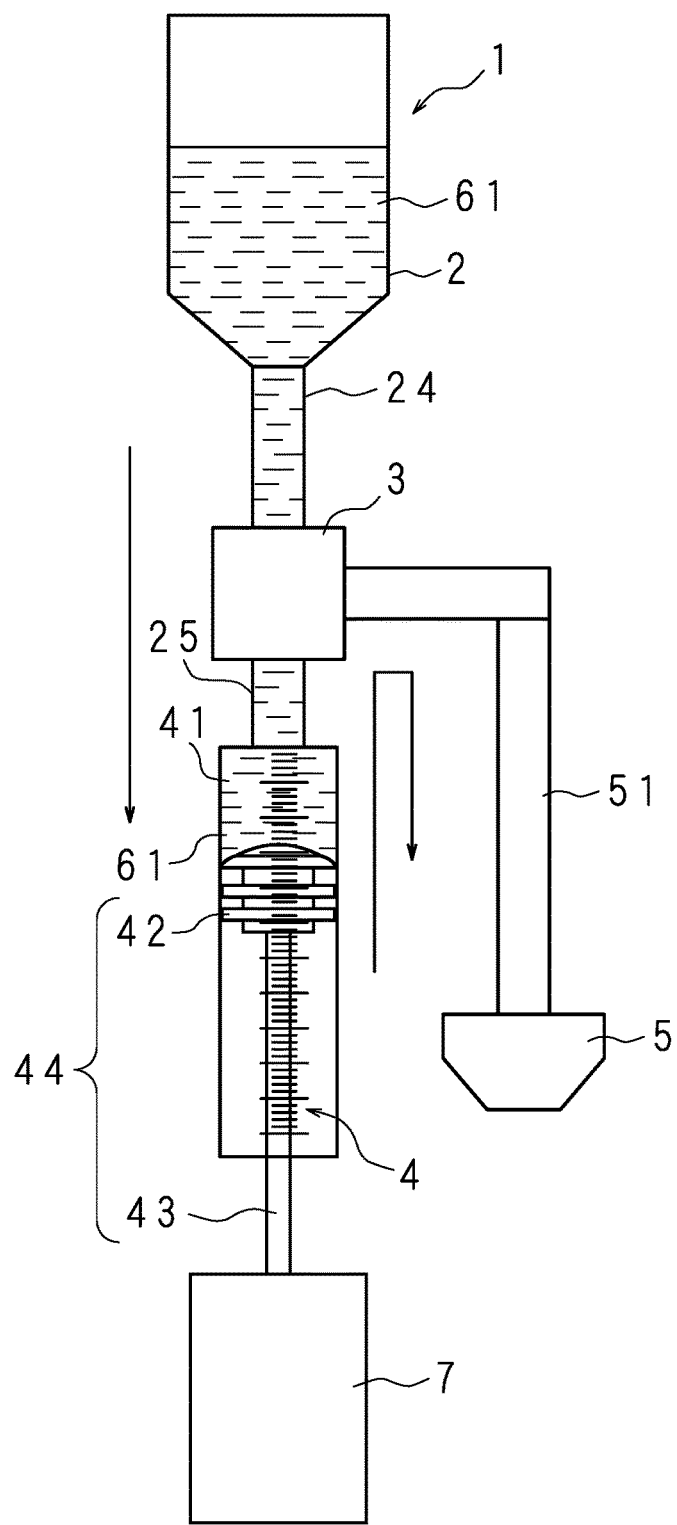
FIG. 4 is a schematic enlarged view illustrating the structure of a liquid crystal dropping device.

FIG. 3 is a schematic view of a liquid crystal dropping device 1 and a mother glass substrate 31 according to an embodiment of the present invention. FIG. 4 is a schematic enlarged view illustrating the structure of the liquid crystal dropping device 1. A stage 9 is located in a predetermined liquid crystal dropping area, and the mother glass substrate 31 including eight color filter substrates 23 is arranged on the stage 9. The liquid crystal dropping device 1 is located above the mother glass substrate 31. The liquid crystal dropping area is under the atmospheric pressure.

The liquid crystal dropping device 1 includes a liquid crystal bottle 2, a three-way valve 3, a liquid crystal ejecting part 4, a nozzle 5 and a driving unit 7. The lower end of the liquid crystal bottle 2 has a tapered shape and the liquid crystal material 61 is stored therein. The lower end of the liquid crystal bottle 2 is connected to one end of a flow pipe 24, while the other end of the flow pipe 24 is connected to the three-way valve 3. One end of the flow pipe 25 is connected to the three-way valve 3, while the other end of the flow pipe 25 is connected to the liquid crystal ejecting part 4.

The liquid crystal ejecting part 4 is made of glass for example, and includes a syringe 41 with a bottomed cylindrical shape as well as a plunger 44 located in the syringe 41. The plunger 44 is made of, for example, fluorine-based resin such as polytetrafluoroethylene, and includes: a slide part 42 which has substantially the same diameter as the inner diameter of the syringe 41 and slides in the syringe 41; and a support 43 having a bar-like shape, one end of which is connected to the slide part 42 while the other end of which is connected to the driving unit 7, to support the slide part 42.

The liquid crystal bottle 2, the three-way valve 3, the liquid crystal ejecting part 4 and the nozzle 5 constitute a discharge head 26.

The discharge head 26 and the driving unit 7 are configured to be moved over the mother glass substrate 31 by the moving unit 32.

The driving unit 7 is constituted by, for example, a stepping motor which controls the extruded amount (displaced amount) of the slide part 42 by the amount of rotation.

One end of the flow pipe 51 is connected to the three-way valve 3, while the other end thereof is connected to the nozzle 5. Because it is easier to shed liquid crystal droplets when the nozzle 5 has a high water-repellent property, the nozzle 5 is preferably coated with, for example, polytetrafluoroethylene. In order to optimize the size of a liquid crystal droplet formed at the tip end of the nozzle 5 with respect to the amount of extrusion of the plunger 44, the nozzle diameter as well as the inner diameter of the syringe 41 are designed in accordance with the specific gravity, the viscosity, the surface tension, the compatibility to the nozzle 5 or the water-repellent property of the liquid crystal material 61.

The discharge head 26 is prepared for each liquid crystal material 61.

It is so configured that the movement of the discharge head 26 by the moving unit 32, the ascending/descending of the plunger 44 by the driving unit 7 and the opening/closing of the three-way valve 3 are controlled by the operation control unit 8.

Figure 5:
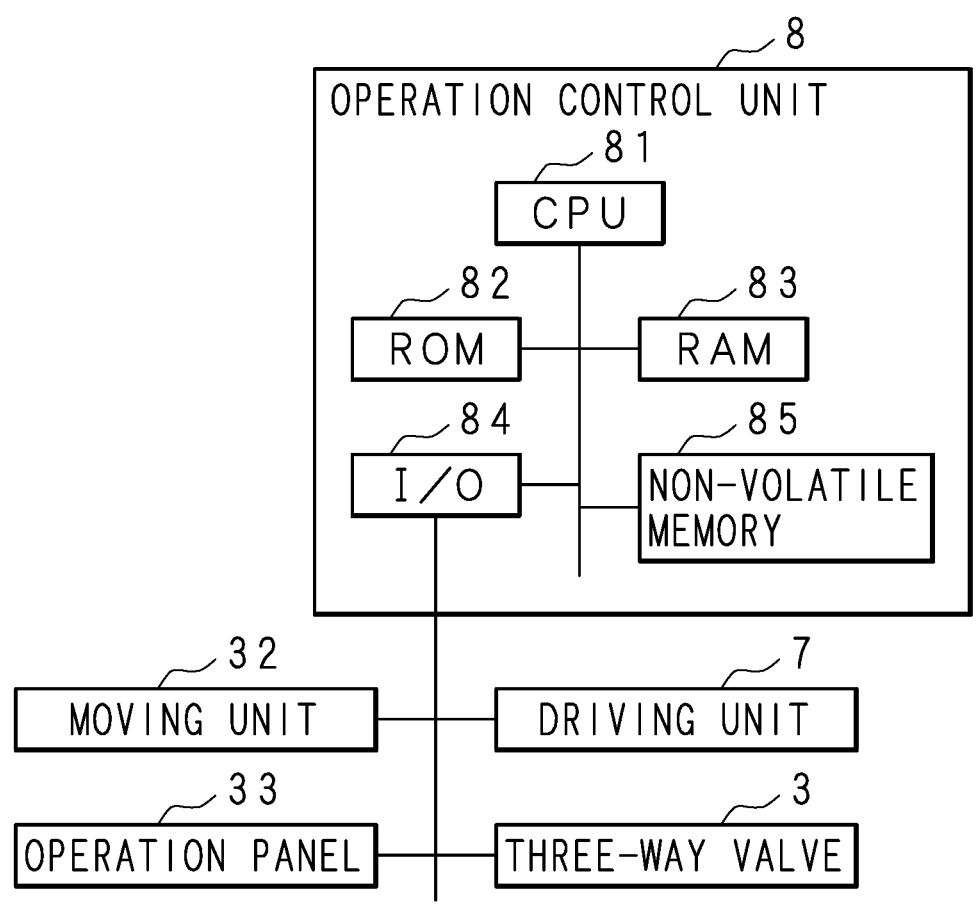
FIG. 5 is a block diagram illustrating an operation control unit.

FIG. 5 is a block diagram illustrating an operation control unit 8.

The operation control unit 8 is configured by a central processing unit (CPU) 81, a read only memory (ROM) 82, a random access memory (RAM) 83, an input/output interface (I/O) 84 and a rewritable non-volatile memory 85 that are connected via a shared bus. The CPU 81 reads out and executes a control program stored in the ROM 82.

The non-volatile memory 85 is constituted by, for example, an electrically erasable programmable read only memory (EEPROM), an erasable programmable read only memory (EPROM) or the like, and stores in advance a dropping condition table or the like in which the type of the display panel 30, the liquid crystal material 61 and the discharge head 26 to be used as well as the dropping condition such as an amount of dropping are associated with one another.

The moving unit 32, the operation panel 33, the driving unit 7 and the three-way valve 3 are connected to the I/O 84. On the operation panel 33, various types of switches operated by the user are arranged, including a power switch, a start switch for instructing to start the operation, a switch for instructing to stop the operation, a switch for instructing on a measurement which will be described later, a switch for instructing on the second driving which will be described later, and so forth.

When the display panel 30 is manufactured by the manufacturing method for the display module 91 according to the present invention, first, eight TFT substrates 10, for example, are formed on a mother glass substrate (not depicted), and eight color filter substrates 23, for example, are formed on another mother glass substrate 31. Next, ultraviolet curable resin is used, or ultraviolet curable resin and thermally curable resin are used, as material for sealing, to form a frame-shaped seal pattern by a dispenser in an image display region of the mother glass substrate 31 for the color filter substrate 23. Liquid crystal material 61 is dropped into a seal pattern with the ODF method, and thereafter the mother glass substrate for the TFT substrate 10 is bonded to the mother glass substrate 31, and the sealing is cured. Subsequently, the TFT substrate 10 and the color filter substrate 23 are cut out from the two bonded mother glass substrates while they are being bonded, and through various processes, the display panel 30 is obtained.

When the liquid crystal material 61 is dropped onto the mother glass substrate 31, first, the discharge head 26 is moved to a predetermined position above the color filter substrate 23 on the mother glass substrate 31 by the moving unit 32 based on the control of the operation control unit 8. The flow pipe 24 side and the flow pipe 25 side of the three-way valve 3 are then opened, and the plunger 44 is lowered by the driving unit 7 to feed a predetermined amount of liquid crystal material 61 to the syringe 41. Next, the flow pipe 25 side and the flow pipe 51 side of the three-way valve 3 are opened, and the plunger 44 is raised by the driving unit 7 to feed the liquid crystal material 61 to the nozzle 5, from which the liquid crystal material 61 is dropped onto the color filter substrate 23. The operation control unit 8 causes the moving unit 32 to move the discharge head 26 to multiple positions on the color filter substrate 23, to drop the liquid crystal material 61. This is repeated for each color filter substrate 23. The driving based on the control of the operation control unit 8 is referred to as the first driving.

The mother glass substrate 31 corresponds to the device type of the display module 91, and switches the dropping condition for each device type of the display module 91 as described above.

In the case of dropping the liquid crystal material 61 successively onto the mother glass substrate 31 for the display module 91 of the same type, the liquid crystal material 61 is successively supplied to the syringe 41, and the plunger 44 is raised and lowered continuously with a stroke of approximately 50 mm, causing no problem of adherence of the slide part 42.

When the device type of the display module 91 is switched, the discharge head 26 is removed from the driving unit 7 and exchanged with the discharge head 26 for the next device type, to switch the liquid crystal material 61. Here, in order to confirm whether or not the liquid crystal material 61 can be dropped normally for the next device type, a measurement work is performed for weighing the dropping amount of the liquid crystal material 61.

After the work of switching the device type, until the process of dropping the liquid crystal material 61 is started, the plunger 44 does not slide, which causes a problem of adherence of the slide part 42 described above. According to the present invention, after the work of switching the device type, until the process of dropping the liquid crystal material 61 is started for producing the next device type, the operation control unit 8 performs the second driving to cause the plunger 44 to slide with a reciprocating distance (0.1-0.2 mm, for example) which is shorter than the stroke described above.

The processing of the first driving and the second driving performed by the operation control unit 8 will be described below.

Figure 6:
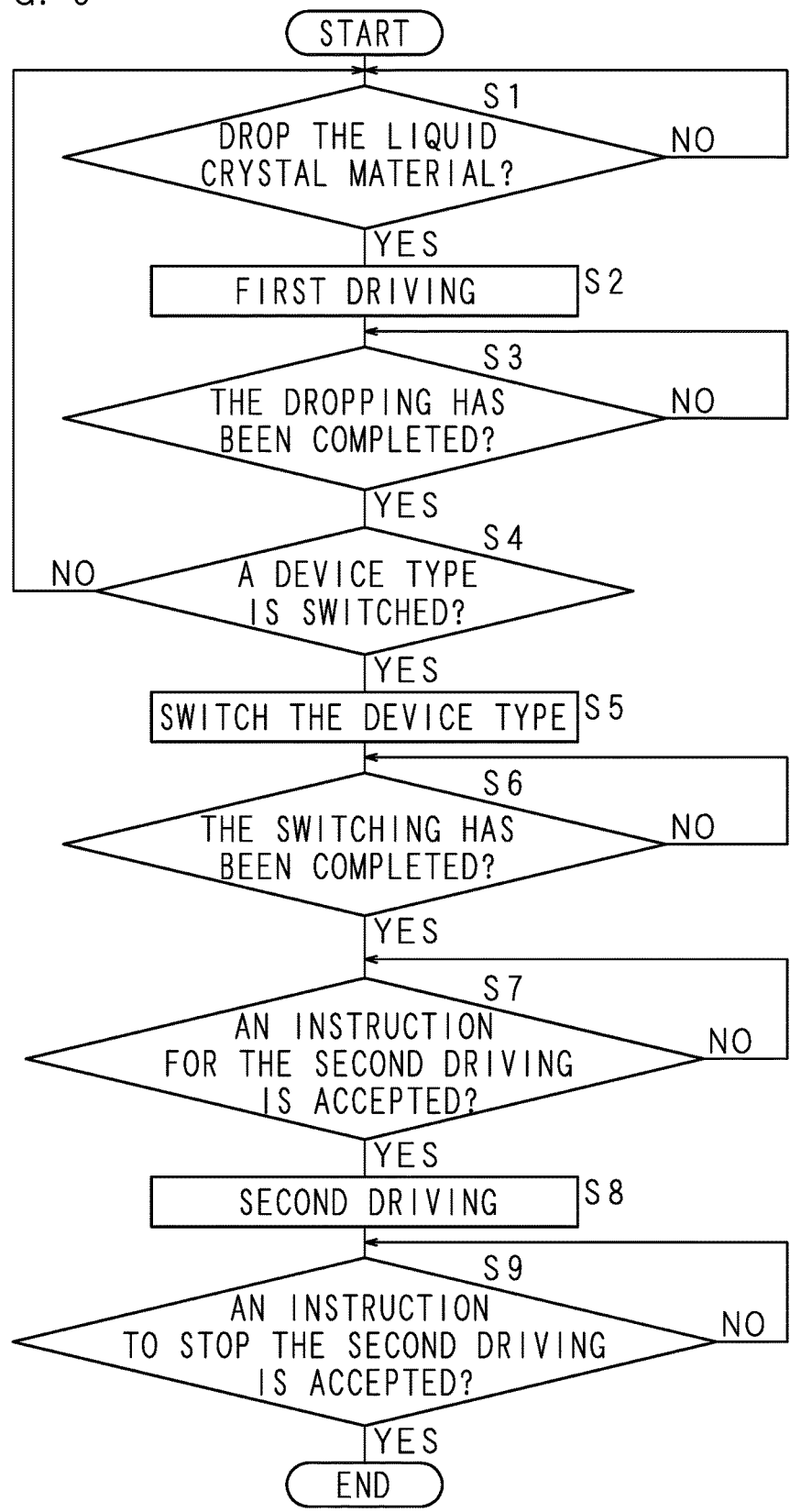
FIG. 6 is a flowchart illustrating the processing procedure of the first driving and the second driving by the operation control unit.
Figure 7:
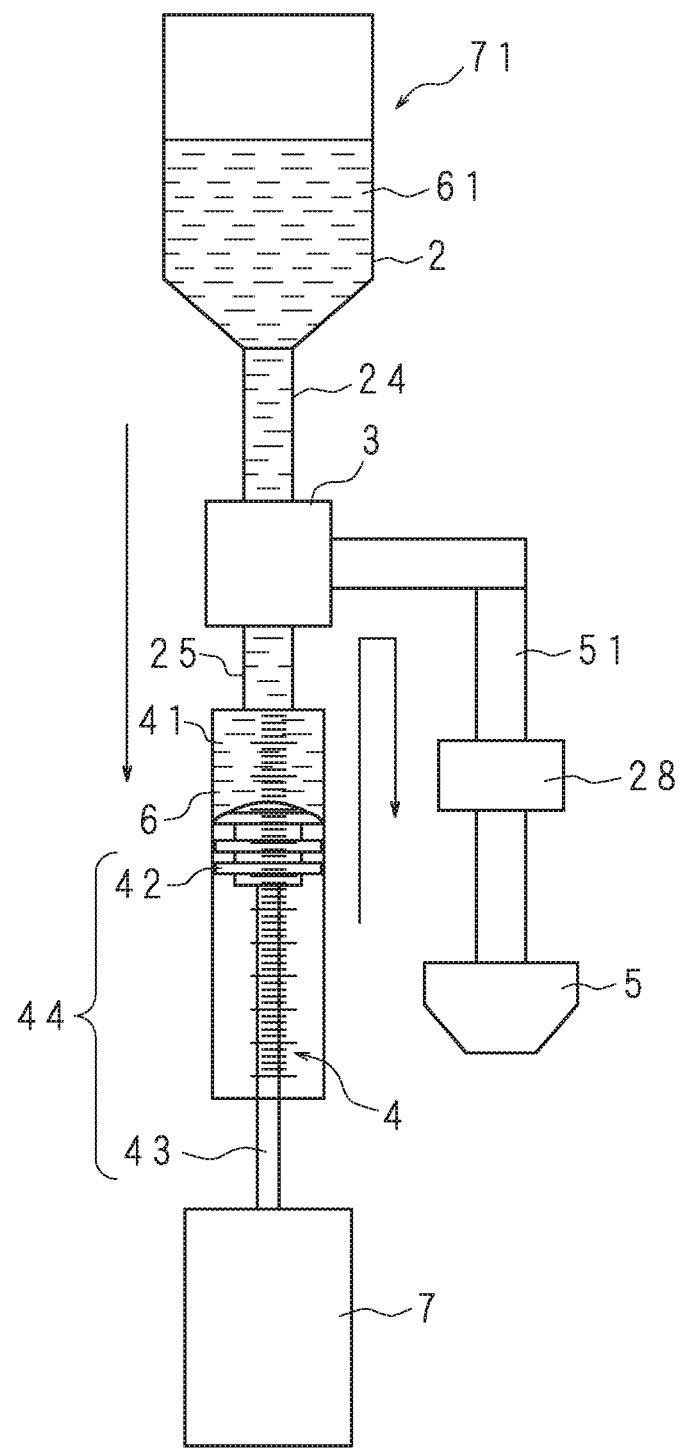
FIG. 7 is a schematic side view illustrating the structure of a liquid crystal dropping device according to Japanese Patent Application Laid-Open Publication No. 2006-133251.

FIG. 6 is a flowchart illustrating the processing procedure of the first driving and the second driving by the operation control unit 8.

A CPU 81 of the operation control unit 8 first determines whether or not an instruction has been accepted to start dropping the liquid crystal material 61 (S1). If it is determined that the instruction has not been accepted (S1: NO), the CPU 81 repeats the processing of determining.

If it is determined that the instruction has been accepted (S1: YES), the CPU 81 performs the first driving (S2). The CPU 81 causes the moving unit 32 to move the discharge head 26 to a predetermined position for each color filter substrate 23, and raises/lowers the plunger 44 to drop the liquid crystal material 61 onto the color filter substrate 23.

The CPU 81 determines whether or not the dropping has been completed (S3). If it is determined that the dropping has not been completed (S3: NO), the CPU 81 repeats the processing of determining.

If it is determined that the dropping has been completed (S3: YES), the CPU 81 determines whether or not an instruction to switch the device type is accepted (S4). If it is determined that the instruction to switch the device type has not been accepted (S4: NO), the CPU 81 returns the processing to step S1. If the device type is not switched, the liquid crystal material 61 continues being dropped onto the color filter substrate 23 of the same device type, and the slide part 42 is continuously reciprocated in the syringe 41, thereby causing no problem of adherence to the syringe 41.

If it is determined that an instruction to switch the device type has been accepted (S4: YES), the CPU 81 reads out a dropping condition table from the non-volatile memory 85 to switch the device type by, for example, performing a measurement work (S5), and determines whether or not the switching of the device type has been completed (S6). If it is determined that the switching of the device type has not been completed (S6: NO), the CPU 81 repeats the processing of determining.

If it is determined that the switching of the device type has been completed (S6: YES), the CPU 81 determines whether or not an instruction for the second driving is accepted (S7). If it is determined that the instruction for the second driving has not been accepted (S7: NO), the CPU 81 repeats the processing of determining.

If it is determined that the instruction for the second driving has been accepted (S7: YES), the CPU 81 performs the second driving which causes the plunger 44 to slide with a reciprocating distance shorter than the stroke for dropping the liquid crystal material 61 (S8).

The CPU 81 determines whether or not an instruction to stop the second driving is accepted (S9). If it is determined that the instruction to stop the second driving has not been accepted (S9: NO), the CPU 81 repeats the processing of determining.

If it is determined that the instruction to stop the second driving has been accepted (S9: YES), the CPU 81 stops the second driving and terminates the processing.

If an instruction to drop the liquid crystal material 61 onto the color filter substrate 23 of a switched device type has been accepted, the CPU 81 performs the processing of step S1 and repeats the subsequent steps.

According to the present embodiment, as the driving unit 7 reciprocates the plunger 44 before the liquid crystal material 61 is dropped onto the color filter substrate 23, it is suppressed that the slide part 42 is adhered to the inner wall of the syringe 41. Accordingly, it is suppressed that the synthetic resin is peeled off when the process of dropping liquid crystal material is performed so that it is suppressed that dust generated by peeled resin as foreign substances gets mixed into the liquid crystal material 61. Specifically, since the syringe 41 is made of glass and the plunger 44 is made of fluorine-based resin, the adherence of the slide part 42 is suppressed. The filter 28 as in the liquid crystal dropping device 71 is eliminated, thereby causing no pressure loss and achieving a preferable dropping accuracy.

Accordingly, a display failure such as a luminous-dot failure occurring at the display module 91 is suppressed, while preferable display quality and high yield may be obtained.

It should be understood that the embodiments disclosed herein are illustrative and non-restrictive in every respect. Since the scope of the present invention is defined by the appended claims rather than by the description preceding them, and all changes that fall within metes and bounds of the claims, or equivalence of such metes and bounds thereof are therefore intended to be embraced by the claims.

For example, while the present embodiment has described the case where the liquid crystal material 61 is dropped onto the color filter substrate 23, it is not limited thereto but the liquid crystal material 61 may alternatively be dropped onto the TFT substrate 10.

Furthermore, the liquid crystal display apparatus is not limited to the display module 91 of the TV receiver 90.

It is to be noted that, as used herein and in the appended claims, the singular forms "a", "an", and "the" include plural referents unless the context clearly dictates otherwise.

The invention claimed is:

1. A method of manufacturing a liquid crystal display device, comprising, with the use of a liquid crystal dropping device including a syringe which is used for storing the liquid crystal material, a plunger being reciprocated in the syringe and a driving unit which drives the plunger, the steps of dropping the liquid crystal material onto a surface of a first substrate; and bonding a second substrate to a part of the surface of the first substrate, further comprising steps of:

switching the syringe and the plunger in accordance with the first substrate; and reciprocating the plunger by the driving unit after the step of switching and before the step of dropping from a switched syringe, wherein a reciprocating distance of the plunger in the step of reciprocating is shorter than a stroke of the plunger required for dropping the liquid crystal material.

2. A liquid crystal dropping device configured to drop the liquid crystal material onto a first substrate, the device comprising:

a syringe which is used for storing the liquid crystal material;

a plunger being reciprocated in the syringe; and a driving unit which drives the plunger, the device further comprising:

a unit which controls reciprocation of the plunger by the driving unit, wherein the reciprocation is conducted after the syringe and the plunger are switched in accordance with the first substrate and before a liquid crystal material from a switched syringe is dropped onto the first substrate, and a reciprocating distance of said reciprocation is shorter than a stroke of the plunger required for dropping the liquid crystal material.

3. The liquid crystal dropping device according to claim 2, wherein the syringe is made of glass, and a leading end of the plunger is made of a fluorine-based resin.

* * * * *